United States Patent [19]

Walker

[11] Patent Number: 4,522,658

[45] Date of Patent: * Jun. 11, 1985

[54] METHOD AND COMPOSITION FOR PROTECTING METAL SURFACES FROM OXIDATIVE ENVIRONMENTS

[75] Inventor: Michael L. Walker, Duncan, Okla.

[73] Assignee: Halliburton Company, Duncan, Okla.

[*] Notice: The portion of the term of this patent subsequent to Feb. 12, 2002 has been disclaimed.

[21] Appl. No.: 623,276

[22] Filed: Jun. 21, 1984

[51] Int. Cl.$^3$ .............................................. B05D 5/00
[52] U.S. Cl. ................... 148/6.14 R; 427/435; 252/855 C; 252/389 R; 422/12
[58] Field of Search ....................... 252/855 C, 389.54; 422/12; 148/6.14 R; 427/435

[56] References Cited

U.S. PATENT DOCUMENTS 1,915,148  6/1933  Berliner et al. .
2,431,715 12/1947  Wachter .
2,814,593 11/1957  Beiswanger et al. .............. 252/8.55
2,869,978  1/1959  Fischer .
3,506,581  4/1970  Kucera ................................ 252/8.55
3,779,935 12/1973  McDougall .

Primary Examiner—Richard Bueker
Attorney, Agent, or Firm—Robert A. Kent; Thomas R. Weaver

[57] ABSTRACT

The present invention relates to a method of inhibiting the oxidative effect of an oxidative environment upon a metal surface utilizing a composition comprising an inhibiting effective amount of an acetylenic alcohol, a quaternary ammonium compound, an aromatic hydrocarbon, an antimony compound, and an aqueous fluid. The metal surface to be protected is contacted with the composition whereby a deposit or coating of at least a portion of the composition constituents is formed on the metal surface.

18 Claims, No Drawings

METHOD AND COMPOSITION FOR PROTECTING METAL SURFACES FROM OXIDATIVE ENVIRONMENTS

BACKGROUND OF THE INVENTION

The present invention relates to a method and composition for protecting a metal surface exposed to an oxidative environment.

Acidizing and fracturing treatments using aqueous acidic solutions commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons from the formation.

In acidizing treatments, aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation.

In fracture acidizing treatments, one or more fractures are produced in the formation and the acidic solution is introduced into the fracture to etch flow channels in the fracture face. The acid also enlarges the pore spaces in the fracture face and in the formation.

A problem associated with acidizing subterranean formations is the oxidation or attack by the solution on the tubular goods in the well bore and the other equipment used to carry out the treatment. The expense of repairing or replacing damaged equipment is extremely high.

It would be desirable to provide a composition and method for treating a metal surface which reduces at least some of the oxidation problem resulting from contact of the oxidative environment with ferrous and other metals.

SUMMARY OF THE INVENTION

The present invention relates to a method and composition for protecting metal surfaces, and particularly ferrous metals, from the effects of oxidative environments. The method is accomplished by introducing the metal surface to be protected into contact with the composition of the present invention. The contacting may be effected in any manner that coats the metal surface to be protected with the composition. The contacting of the metal surface with the composition results in the formation of a surface deposit upon the metal surface to be protected comprised of constituents contained in the composition.

The composition comprises an aqueous solution containing effective amounts of one or more acetylenic alcohols, a quaternary ammonium compound, an aromatic hydrocarbon having high oil-wetting characteristics and an antimony compound. The aqueous solution can have a pH of from about 0 to about 9. The antimony compound can comprise any antimony compound which is capable of activation by the other constituents of the inhibitor. The composition is effective in reducing the oxidative effects of acidic solutions in contact with ferrous metals where the temperature at which the metal and acid are in contact is between about ambient and 500° F.

DESCRIPTION OF THE PREFERRED EMBODIMENT

In accordance with the present invention, there is provided a composition comprising an aqueous fluid and effective amounts of one or more acetylenic alcohols, a quaternary ammonium compound, an aromatic hydrocarbon having high oil-wetting characteristics and an antimony compound which is capable of activation by the other constituents of the composition.

The aqueous fluid can comprise any aqueous solution which does not adversely react with the constituents. The aqueous fluid can have a pH in the range of from about 0 to about 9. Preferably, the aqueous fluid has a pH level in the range of from about 1 to about 4. The pH of the aqueous fluid can be adjusted with the use of various acids or bases. The acids employed in the practice of the present invention can comprise hydrochloric acid or mixtures of hydrochloric acid with hydrofluoric and formic acid, acetic acid, formic acid, hydrofluoric acid or mixtures of these acids and the like. The bases can comprise various alkali metal hydroxides or the like.

The antimony compound which is employed in the present invention can comprise any antimony compound which is activated by the other constituents of the composition to cause the composition to form a protective deposit on the exposed metal surface to substantially reduce the oxidative effect of an oxidative environment on ferrous metals, copper, brass, duplex metals and the like in contact with the acidic solution. The antimony compound can comprise, for example, antimony trichloride, antimony pentachloride, alkali metal salts of antimony tartrate, antimony adducts of ethylene glycol, solutions containing ethylene glycol, water and the oxidized product of hydrogen peroxide and antimony trioxide or any other trivalent antimony compound and the like.

The acetylenic alcohols employed in the present invention may suitably include substantially any of the acetylenic compounds having the general formula:

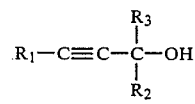

wherein $R_1$, $R_2$ and $R_3$ are hydrogen, alkyl, phenyl, substituted phenyl or hydroxy-alkyl radicals. Preferably, $R_1$ comprises hydrogen. Preferably, $R_2$ comprises hydrogen, methyl, ethyl or propyl radicals. Preferably, $R_3$ comprises an alkyl radical having the general formula $C_nH_{2n}$ where n is an integer from 1 to 10.

Some examples of acetylenic alcohols which can be employed in accordance with the present invention are, for example, methyl butynol, methyl pentynol, hexynol, ethyl octynol, propargyl alcohol, benzylbutynol, ethynylcyclohexanol and the like. Preferred alcohols are hexynol, propargyl alcohol, methyl butynol and ethyl octynol.

The quaternary ammonium compounds employed in the present invention comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, isoquinoline quaternaries, benzoquinoline quaternaries, chloromethyl naphthalene quaternaries of the above, admixtures of the compounds and the like.

The hydrocarbon compound can comprise substantially any aromatic compound which exhibits high oil-wetting characteristics. The aromatic hydrocarbon compound can comprise, for example, xylenes, saturated biphenyl-xylenes admixtures, heavy aromatic naphtha, heavy aromatic solvent, tetralene, tetrahydroquinoline, tetrahydronaphthalene and the like.

The acetylenic alcohol, aromatic hydrocarbon and quaternary amine are present in the composition in an amount sufficient to effect an activation of the antimony compound whereby the composition can significantly reduce the oxidative effect of an oxidative environment on a ferrous metal or other metal. Preferably, the acetylenic alcohol is present in the composition in an amount sufficient to comprise at least five percent by volume of the non-aqueous constituents of the composition. Most preferably, the acetylenic alcohol comprises from about 5 to about 35 percent of the non-aqueous constituents of the composition. Preferably, the ratio of the volume of acetylenic alcohol to the volume of aromatic hydrocarbons is at least about 0.05:1.0. Most preferably, the ratio of acetylenic alcohol to aromatic hydrocarbon is in the range of from about 0.08:1.0 to about 1.66:1.0. The quaternary amine and any additional additives constitute the remainder of the non-aqueous constituents of the composition. Preferably, a sufficient quantity of the antimony compound is added to obtain a solution having a concentration of from about 0.007 to about 0.1 molar. Larger quantities of the antimony compound may be utilized to form the protective coating, however, such quantities generally are unnecessary to achieve effective protection. The antimony compound may be admixed with the other constituents of the composition to form a premixed solution or it may be formulated in situ in an acidic solution by the addition of a sufficient quantity of the antimony compound and a quantity of the other constituents which may be premixed.

Additional additives which can be present in the aqueous solution of the composition can comprise, for example, a solvent such as an alkanol to assist in maintaining the constituents of the composition as a homogeneous admixture.

Alkanols which can be employed in the present invention are, for example, methyl, ethyl, propyl, isopropyl, butyl, pentyl, hexyl, heptyl, octyl and the higher liquid members of these aliphatic alcohols. Preferably, the quantity of alkanol employed is that which merely is sufficient to maintain the constituents in homogeneous admixture as excess quantities have no demonstrable effect on the effectiveness of the composition. Preferably, the alkanol comprises less than about fifteen percent by volume of the composition to avoid unnecessary dilution of the composition.

The composition also can include a non-ionic surfactant which facilitates dispersion of the organic constituents of the composition in the aqueous solution.

The non-ionic surfactant can comprise an ethoxylated oleate, tall oils or ethoxylated fatty acids. The 8 to 20 moles of ethylene oxide adducts of octyl phenol, nonyl phenol, tridecyl phenol and the like are preferred. Sufficient non-ionic surfactant is admixed with the other constituents of the composition to facilitate dispersion of the constituents in the aqueous solution. Preferably, the surfactant comprises less than about 20 percent by volume of the non-aqueous constituents of the composition to avoid unnecessary dilution of the composition.

The method of the present invention is carried out in one embodiment by first admixing effective amounts of the acetylenic alcohol, quaternary ammonium compound aromatic compound having oil-wetting characteristics and antimony compound in an aqueous solution. If necessary, the pH of the aqueous solution can be adjusted by the addition of a suitable acid or base to provide a solution pH in the range of from about 0 to about 4. While no particular order of addition of the constituents to the aqueous fluid is necessary, preferably the acetylenic alcohol, quarternary ammonium compound and aromatic compound are admixed with the aqueous prior to addition of the antimony compound. The amount of the non-aqueous constituents present in the composition can vary over a substantial range. Preferably, the non-aqueous constituents are present in an amount of at least about 5 gallons per 1000 gallons of aqueous fluid and, preferably, in an amount of from about 10 to 30 gallons per 1000 gallons of aqueous fluid.

The composition of the present invention can be prepared in any suitable mixing tank equipped with suitable mixing means well known to individuals skilled in the art.

The metal surface to be protected can be contacted with the composition by immersion therein or by flowing the composition across the metal surface to be protected. The contacting of the metal surface with the composition results in the formation or deposition of a surface coating upon the metal surface. The composition preferably is contacted with the metal surface to be protected for from about 15 minutes to over several hours. At elevated contacting temperatures, a satisfactory protective coating can be formed by immersion in the composition for from about 1 to 4 hours. When a metal is merely immersed in the composition, agitation of the composition by some conventional means is desirable as this reduces the total time required for a satisfactory protective coating to form. The surface deposit is comprised of constituents contained in the composition. The contacting can be effected at a temperature of from about ambient to in excess of about 400° F. While the specific mechanism of the present invention is unclear, it is believed that an antimony metal deposit is formed in response to a moderated change in the oxidation state of the metal surface when in contact with the composition of the present invention. Surprisingly, it has been found that while the composition of the present invention is capable of protecting a metal surface in contact with an aqueous acidic solution at temperatures in excess of 400° F., it also will protect the metal surface for extended periods of time when placed in other oxidative environments. The composition of the present invention is capable of protecting a metal surface against the oxidative effects of moist air having humidity levels in excess of 40 percent for months.

In another embodiment of the present invention, the composition is utilized to protect the metal surface of a cased well bore during treatment of a subterranean formation with an acidic solution and to provide residual oxidation protection to the casing subsequent to the treatment. The composition is prepared in accordance with the method of the present invention. The aqueous fluid comprises a 15 percent hydrochloric acid solution. The acidic solution containing the composition of the present invention is introduced into the well bore, pumped therethrough and introduced into the subterranean formation. During contacting of said casing comprising a ferrous metal with said composition, a protective coating is formed upon the metal surface exposed to the acidic solution. The protective coating substantially protects the metal surface of the casing from corrosion by the acid present in the solution. The injected acidic solution dissolves soluble constituents within the subterranean formation whereby at least a portion of the acidic content of the solution is neutralized.

The partially neutralized acidic solution then can be flowed back through the well bore for removal at the earth's surface. Thereafter, the well bore may be placed in production to produce, for example, a mixture of conate water and oil from the subterranean formation. The protective coating on the casing in the well bore provides residual protection to the metal casing's surface contacted by the water to protect the surface from the oxidative environment caused by the presence of the water.

To further illustrate the effectiveness of the composition of the present invention in preventing the oxidation of a metal surface, but not by way of limitation, the following examples are provided.

EXAMPLE I

To determine the effectiveness of the composition of the present invention in inhibiting oxidation of a metal surface, the following tests were performed. An aqueous acidic solution is prepared by adding a sufficient quantity of concentrated hydrochloric acid or hydrochloric acid and hydrofluoric acid to water to form a solution having the concentrations set forth in Table I. The composition of the present invention is prepared as previously described by admixing the following constituents: a quaternary ammonium compound, a heavy aromatic hydrocarbon compound, acetylenic alcohol, a surfactant comprising an ethoxylated phenol and a solvent comprising an alkanol. A sufficient quantity of the non-aqueous constituents then is added to the aqueous acid to comprise two percent by volume of the solution. Sufficient antimony compound is dissolved in the solution to provide a 0.04 molar antimony concentration. The solution then is heated to a temperature of about 400° F. under a 500 psig over pressure of an inert heat transfer fluid and a weighed sample coupon is suspended in the solution. After the period of time indicated in Table I, the sample coupon is removed from the heated acid solution, washed and visually inspected to determine whether a protective coating had formed upon the metal sample coupon by the acidic solution. Several samples then were kept in an oxidative environment at a temperature of about 60° to 78° F. and a humidity level of about 40 to 90 percent for over 266 days. The coupons then were inspected for visual signs of oxidation. A control coupon was tested in each instance in an equivalent acidic solution without the composition of the present invention. Table II sets forth the results of tests performed in accordance with the foregoing procedure to determine whether or not a surface coating forms on other metals.

TABLE I

| Sample Coupon Material | Acidic Solution Constituent | Duration of Exposure to Composition | Protective Coating Formed | Oxidation Inhibition to Humidity Exposure |
|---|---|---|---|---|
| Type N-80 Steel | 15% HCl | 2 (Control) | — | Extensive oxidation |
| Type N-80 Steel | pH4 (HCl) | 2 (Control) | — | Extensive oxidation |
| Type N-80 Steel | 15% HCl | 2 | yes | No apparent oxidation |
| Type N-80 Steel | pH4 (HCl) | 2 | yes | No apparent oxidation |

TABLE II

| Sample Coupon Material | Acidic Solution Constituent | Duration of Exposure to Composition | Protective Coating Formed |
|---|---|---|---|
| Hastelloy C276 | 15% HCl | 4 | yes |
| Hastelloy C276 | 12% HCl, 3% HF | 4 | yes |
| Monel K500 | 15% HC | 4 | yes |
| Monel K500 | 12% HCl, 3% HF | 4 | yes |
| Incoloy 925 | 15% HC | 4 | yes |
| Incoloy 925 | 12% HCl, 3% HF | 4 | yes |

The results clearly illustrate the ability of the composition of the present invention to form a protective coating upon a metal surface. The data also illustrates that the protective coating will protect the metal surface from oxidation over an extended period of time.

EXAMPLE II

To illustrate the pH levels at which the protective coating can be formed, the following tests were performed. Aqueous solutions having a pH of about 0, 4.5 and 7 were prepared. The pH of zero was obtained with hydrochloric acid, pH of 4.5 with acetic acid and 7 with hydrochloric acid and sodium hydroxide. The composition of the present invention then is prepared utilizing the various aqueous solutions as previously described by admixing the following constituents with the aqueous solutions: a quaternary ammonium compound, a heavy aromatic hydrocarbon compound, acetylenic alcohol, a surfactant comprising an ethoxylated phenol and a solvent comprising an alkanol. A sufficient quantity of the non-aqueous constituents are admixed with the aqueous solutions to comprise two percent by volume of the solutions. Sufficient antimony compound is dissolved in the solutions to provide a 0.04 molar antimony concentration. The solutions then are heated to a temperature of about 350° F. under a 500 psig over pressure of an inert heat transfer fluid and a type N-80 steel coupon is placed in each solution. After 4 hours the coupons are removed from the solution and examined for the presence of a protective surface coating. Each coupon was found to have a protective coating formed upon its surface.

The results clearly illustrate the wide pH range over which the protective coating can be formed to protect a metal surface from an oxidative environment.

EXAMPLE III

To determine the cohesiveness of the protective coating of the present invention, the following tests were performed. The composition of the present invention is prepared as in Examples I and II utilizing an aqueous solution comprised of 7½ percent hydrochloric acid. The composition is heated to a temperature of 400° F. under a 500 psig over pressure of an inert heat transfer fluid. Several type N-80 steel coupons then are immersed in the composition for four hours. The coupons then are removed, washed and inspected for protecting coating formation. Each coupon has developed a protective coating. The coated coupons then are placed in acidic solutions having the following pH levels: 2, 4 and 6. The solutions are prepared by admixing concentrated hydrochloric acid with ordinary tap water. The acidic solutions are heated to a temperature of 400° F. under a 500 psig over pressure of an inert heat transfer fluid. After 64 hours, the coupons are removed and inspected to determine whether the protective coating has adhered to the coupon and whether or not the coating is protecting the metal surface of the coupon from oxidation. Each coupon was found to have the coating tightly adhering to the metal coupon's surface and each coupon showed no visual signs of oxidation.

The results clearly illustrate the cohesiveness of the protective plate or coating produced by the practice of the method of the present invention.

EXAMPLE IV

To determine the effectiveness of the composition of the present invention in protecting a metal surface exposed to an oxidative environment, the following tests were performed. An aqueous acidic solution was prepared by adding a sufficient quantity of hydrochloric acid to water to form a 15% solution. This solution was divided into three samples. In the first sample, a sufficient quantity of an antimony compound was dissolved in the solution to provide a 0.04 molar antimony concentration. In the second sample, a composition comprising the following constituents: a quaternary ammonium compound, a heavy aromatic hydrocarbon compound, acetylenic alcohol, a surfactant comprising an ethoxylated phenol and a solvent comprising an alkanol was admixed in an amount sufficient to comprise two percent by volume of the solution. In the third sample, a sufficient quantity of the antimony compound used in the first sample was dissolved in the solution to provide a 0.04 molar antimony concentration and a sufficient quantity of the organic constituent-containing composition used in the second sample to comprise twp percent by volume of the solution. A metal coupon comprising type N-80 steel then was placed in each of the three samples for four hours. The solutions are heated to a temperature of about 400° F. under a 500 psig over pressure of an inert heat transfer fluid. After the 4 hour period of exposure, the coupons are removed from the solutions, washed and visually inspected for formation of the protective coating and to determine the extent of corrosion of the coupon. The coupons then are kept in an oxidative environment at a temperature of about 70° to 78° F. and a humidity level of about 40 to 90 percent to determine if any residual protection against oxidation occurs.

Upon inspection, the coupon in the first sample solution containing only the antimony compound was found to be extensively corroded and no residual coating was present. Upon exposure to the oxidative environment, the coupon was found to rapidly form rust on the coupon surface.

The coupon in the second sample solution containing the organic constituents and no antimony was found to have protected the metal coupon to some extent against corrosion, however, no residul coating was present upon the coupon. Upon exposure to the oxidative environment the coupon was found to rapidly rust.

The coupon in the third sample solution containing the antimony and organic constituents of the composition of the present invention was found to have provided better protection to the metal coupon against corrosion than the second sample solution and a residual coating was present upon the coupon. Upon exposure to the oxidative environment the coupon was found to show no apparent signs of rust for the duration of the exposure to the oxidative environment.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit of scope of the invention as set forth in the appended claims.

What is claimed is:

1. A method of inhibiting the oxidative effect of an oxidative environment in contact with a metal which comprises:

contacting a metal surface with a composition comprising an aqueous fluid, an effective amount of at least one acetylenic alcohol having the general formula

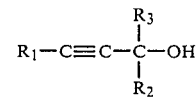

wherein $R_1$, $R_2$ and $R_3$ are selected from the group consisting of hydrogen, alkyl, phenyl, substituted phenyl and hydroxy-alkyl radicals; a quaternary ammonium compound selected from the group consisting of N-methyl, N-benzyl and chloromethyl naphthalene quaternaries of alkyl pyridines and quinoline, isoquinoline compounds, benzoquinoline compounds and mixtures thereof, a hydrocarbon compound which exhibits high oil-wetting characteristics, and an antimony compound capable of activation by the other constituents of said composition whereby the oxidative effect of an oxidative environment in contact with said metal is reduced; and, forming a surface coating comprising at least a portion of the constituents of said composition on said metal surface which is capable of inhibiting the oxidative effects of an oxidative environment upon said metal surface.

2. The method of claim 1 wherein said composition contains a solvent effective amount of an alkanol.

3. The method of claim 1 wherein said composition contains a non-ionic surfactant.

4. The method of claim 1 wherein the volumetric ratio of said acetylenic alcohol to said hydrocarbon having high oil-wetting characteristics is in the range of from about 0.08:1 to about 1.66:1.

5. The method of claim 1 wherein the non-aqueous constituents of the composition are present in an amount of at least about 0.5 percent by volume of said composition.

6. The method of claim 1 wherein said antimony compound comprises at least one member selected from the group consisting of antimony trichloride, antimony pentachloride, alkali metal salts of antimony tartrate, antimony tartrate, antimony trifluoride, antimony adducts of ethylene glycol, and solutions containing ethylene glycol, water and the oxidized product of hydrogen peroxide and at least one member selected from the group consisting of trivalent antimony compounds.

7. A method of producing a protective coating upon a metal surface to inhibit oxidation which comprises:
contacting a metal surface to be protected with a selected composition maintained at a temperature level in the range of from about ambient to about 500° F. for a sufficient period of time to form a protective coating thereon,
said composition comprising an aqueous fluid, an effective amount of at least one acetylenic alcohol having the general formula

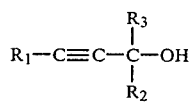

wherein $R_1$, $R_2$ and $R_3$ are selected from the group consisting of hydrogen, alkyl, phenyl, substituted phenyl and hydroxy-alkyl radicals; a quaternary ammonium compound selected from the group consisting of N-methyl, N-benzyl and chloromethyl naphthalene quaternaries of alkyl pyridines and quinoline, isoquinoline compounds, benzoquinoline compounds and mixtures thereof,
a hydrocarbon compound which exhibits high oil-wetting characteristics, and
an antimony compound capable of activation by the other constituents of said composition to form a deposit or coating upon said contacted metal surface.

8. The method of claim 7 wherein said composition contains a solvent effective amount of an alkanol.

9. The method of claim 8 wherein said alkanol has from one to eight carbon atoms.

10. The method of claim 7 wherein said composition contains a non-ionic surfactant.

11. The method of claim 7 wherein the volumetric ratio of said acetylenic alcohol to said hydrocarbon having high oil-wetting characteristics is in the range of from about 0.08:1 to about 1.66:1.

12. The method of claim 7 wherein the non-aqueous constituents of the composition are present in an amount of at least about 0.5 percent by volume of said composition.

13. The method of claim 7 wherein said antimony compound comprises at least one member selected from the group consisting of antimony trichloride, antimony pentachloride, alkali metal salts of antimony tartrate, antimony tartrate, antimony trifluoride, antimony adducts of ethylene glycol, and solutions containing ethylene glycol, water and the oxidized product of hydrogen peroxide and at least one member selected from the group consisting of trivalent antimony compounds.

14. The method of claim 7 wherein the pH of said composition is maintained in a range of from about 0 to about 9.

15. The method of claim 7 wherein the pH of said composition is maintained in a range of from about 1 to about 4.

16. The method of claim 7 wherein said antimony compound is present in an amount sufficient to provide a molar concentration of at least about 0.007.

17. The method of claim 7 wherein the ratio of the volume of the aceylenic alcohol to the volume of said hydrocarbon compound is at least about 0.05:1.

18. The method of claim 7 wherein said composition is agitated during contacting of said metal surface which is to be protected.

* * * * *